US 6,547,829 B1

(12) United States Patent
Meyerzon et al.

(10) Patent No.: US 6,547,829 B1
(45) Date of Patent: Apr. 15, 2003

(54) METHOD AND SYSTEM FOR DETECTING DUPLICATE DOCUMENTS IN WEB CRAWLS

(75) Inventors: Dmitriy Meyerzon, Bellevue, WA (US); Srikanth Shoroff, Issaquah, WA (US); F. Soner Terek, Bellevue, WA (US); Scott Norin, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,511

(22) Filed: Jun. 30, 1999

(51) Int. Cl.[7] .......................... G06F 17/00; G06F 17/30
(52) U.S. Cl. ........................ 715/501.1; 707/2; 707/3; 707/10; 707/104.1
(58) Field of Search .............................. 707/500.1, 3, 2, 707/10, 104.1

(56) References Cited

U.S. PATENT DOCUMENTS

| | | | | |
|---|---|---|---|---|
| 5,813,008 A | * | 9/1998 | Benson et al. ................. | 707/10 |
| 5,913,208 A | * | 6/1999 | Brown et al. ................... | 707/3 |
| 6,351,755 B1 | * | 2/2002 | Najork et al. ............. | 707/501.1 |

* cited by examiner

Primary Examiner—Joseph H. Feild
Assistant Examiner—Rachna Singh
(74) Attorney, Agent, or Firm—Woodcock Washburn LLP

(57) ABSTRACT

A Web crawler application takes advantage of a document store's ability to provide a content identifier (CID) having a value that is a unique function of the physical storage location of a data object or document, such as a Web page. In operation, the crawler first tries to fetch the CID for a document. If the CID attribute is not supported by the document store, the crawler fetches the document, filters it to obtain a hash function, and commits the document to an index if the hash function is not present in a history table. If the CID is available from the document store, the CID is fetched from the document store. The crawler then determines whether the CID is present in the history table, which indicates whether an identical copy of the document in question has already been indexed under a different URL. If the CID is present, indicating that the document has already been indexed, the new URL is placed in the history file but the document itself is not retrieved from the document store, nor is it filtered again to obtain a CID. If the CID is not present in the history table, the full document is retrieved and indexed. The CID data structure is an extension of a known globally unique ID (GUID). Whereas the GUID is a 16-byte number, the CID comprises a 16-byte GUID plus an additional 6-byte number.

22 Claims, 3 Drawing Sheets

METHOD AND SYSTEM FOR DETECTING DUPLICATE DOCUMENTS IN WEB CRAWLS

CROSS REFERENCE TO RELATED APPLICATIONS

The present invention is related to the subject matter of co-pending application Ser. No. 09/345,040, filed on even date herewith, entitled "Method and System for Incremental Web Crawling," which is hereby incorporated by reference.

TECHNICAL FIELD

The present invention relates generally to the fields of computerized publishing and knowledge management, and more particularly to Web crawler applications used, e.g., by Internet search engines. The invention, however, is not limited to use in a Web crawler. On the contrary, the invention could be used in a mail server, directory service, or any system requiring indexing or one-way replication of a document store.

BACKGROUND OF THE INVENTION

There has recently been a tremendous growth in the number of computers connected to the Internet. A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol.

The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document contains text and metadata (commands providing formatting information), as well as embedded links that reference other data or documents. The referenced documents may represent text, graphics, or video.

A Web browser is a client application or, preferably, an integrated operating system utility that communicates with server computers via FTP, HTTP and Gopher protocols. Web browsers receive electronic documents from the network and present them to a user.

An intranet is a local area network containing Web servers and client computers operating in a manner similar to the World Wide Web described above. Typically, all of the computers on an intranet are contained within a company or organization.

The term "search engine" is often used generically to describe both true search engines and directories, although they are not the same. Search engines typically create their listings automatically by "crawling" the Web. A directory, on the other hand, depends on humans for its listings, i.e., a person submits a short description for an entire site or editors write a description for sites they review. The present invention is particularly suited (although not necessarily limited) for use in a search engine of the type that gathers information automatically, i.e., by "crawling" the Web.

Search engines typically include a "crawler" (also called a "spider" or "bot") that visits a Web page, reads it, and then follows links to other pages within the site. The crawler returns to the site on a regular basis to look for changes. Everything the crawler finds goes into an index, which is another part of the search engine. The index is like a file or container holding a copy of every Web page that the crawler finds. If a Web page changes, then the index is updated with new information. The search engine software, which is yet another part of the search engine, is a program that sifts through the pages recorded in the index to find documents fulfilling a search query submitted by a user. The search engine software will typically rank the matches in accordance with their relevance.

Once it is given a set of start addresses and restriction rules, a crawler can retrieve documents following all recursive links from the documents that correspond to the start addresses that pass the restriction rules. The primary application of the crawler is to build an index of a set of documents, so that the index can be searched by end-users that want to locate documents that match certain search criteria.

A crawler can retrieve documents from different stores. Although the primary store is the Web, a crawler can retrieve documents from a mail store, database, or anything else that has textual content.

A shortcoming of Web crawlers and other applications required to access documents stored in one or more document stores is that resources are wasted on retrieving the documents from the store in order to determine whether the same document has already been processed or indexed. For example, a document must be fetched from a document store and filtered to obtain a hash function, and then the hash function must be compared to the hash functions of previously processed documents to determine whether the new document is a replica of another document already represented in the index. There is a need for an improved method and system for identifying duplicate documents, and using this information to avoid unnecessarily retrieving and processing such duplicates. The present invention achieves this goal.

Further background information about Web crawlers is provided below, and may also be found in U.S. patent application Ser. No. 09/105,758, filed Jun. 26, 1998, "Method of Web Crawling Utilizing Crawl Numbers," and U.S. patent application Ser. No. 09/107,227, filed Jun. 30, 1998, "Synchronizing Crawler With Notification Source."

SUMMARY OF THE INVENTION

The present invention provides an improved way to access documents (including Web pages, file system documents, e-mail messages, etc.) stored in one or more document stores on a computer network. For example, the invention could be used in a Web crawler application, mail server, directory service, or any system requiring indexing or one-way replication of a document store. The invention is particularly directed to a method and system for identifying duplicate documents in a document store, and using this information to avoid unnecessarily retrieving and processing such duplicates.

A Web crawler application in accordance with the present invention takes advantage of a document store's ability to provide a content identifier (CID) having a value that is either a unique function of the physical storage location of a data object or document, such as a Web page, or, alternatively, a unique function of the content of the document (i.e., identical documents stored in different locations would have equal CIDs). According to the invention, the crawler first tries to fetch the CID for a document. If the CID attribute is not supported by the document store, the crawler processes the document in accordance with a prior method, e.g., by fetching the document, filtering it to obtain a hash function, and committing the document to an index if the hash function is not present in a History Table (or a separate table associated with the History Table). On the other hand, if the CID is available from the document store, it is fetched by the crawler. The crawler then determines whether the CID is present in the History Table, which indicates whether the document in question has already been indexed under a different URL. If the CID is present, indicating that the document has already been indexed, the new URL is placed in the History Table but the document itself is not retrieved from the document store, nor is it filtered again to obtain a CID. If the CID is not present in the History Table or separate CID table, the full document is retrieved and indexed.

Note that, when the CID is a function of the physical location of the document, as in the exemplary implementation described below, it does not achieve better duplicate detection if the duplicate documents are located in different stores (e.g., different Web sites). However, it does solve the problem of locating duplicates within the same site, which is a very relevant problem for sites with multiple virtual directories, or mail stores. On the other hand, the present invention could be implemented such that duplicates at different storage locations (e.g., where a document is copied to another location and not changed) would have equal CIDs and thus would be identifiable as duplicates based on the CID property. Thus, for example, in the latter embodiment a unique CID would be generated whenever a document is modified and stored. If this document is copied elsewhere, but remains unmodified such that it keeps the same CID, then the present invention can be used to detect that duplicates are stored at different locations.

Preferably, the CID data structure will be an extension of a known globally unique ID (GUID). For example, whereas the GUID is a 16-byte number, the CID of the present invention may comprise a 16-byte GUID plus an additional 6-byte number.

Other features of the present invention are described below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

Figure 1:
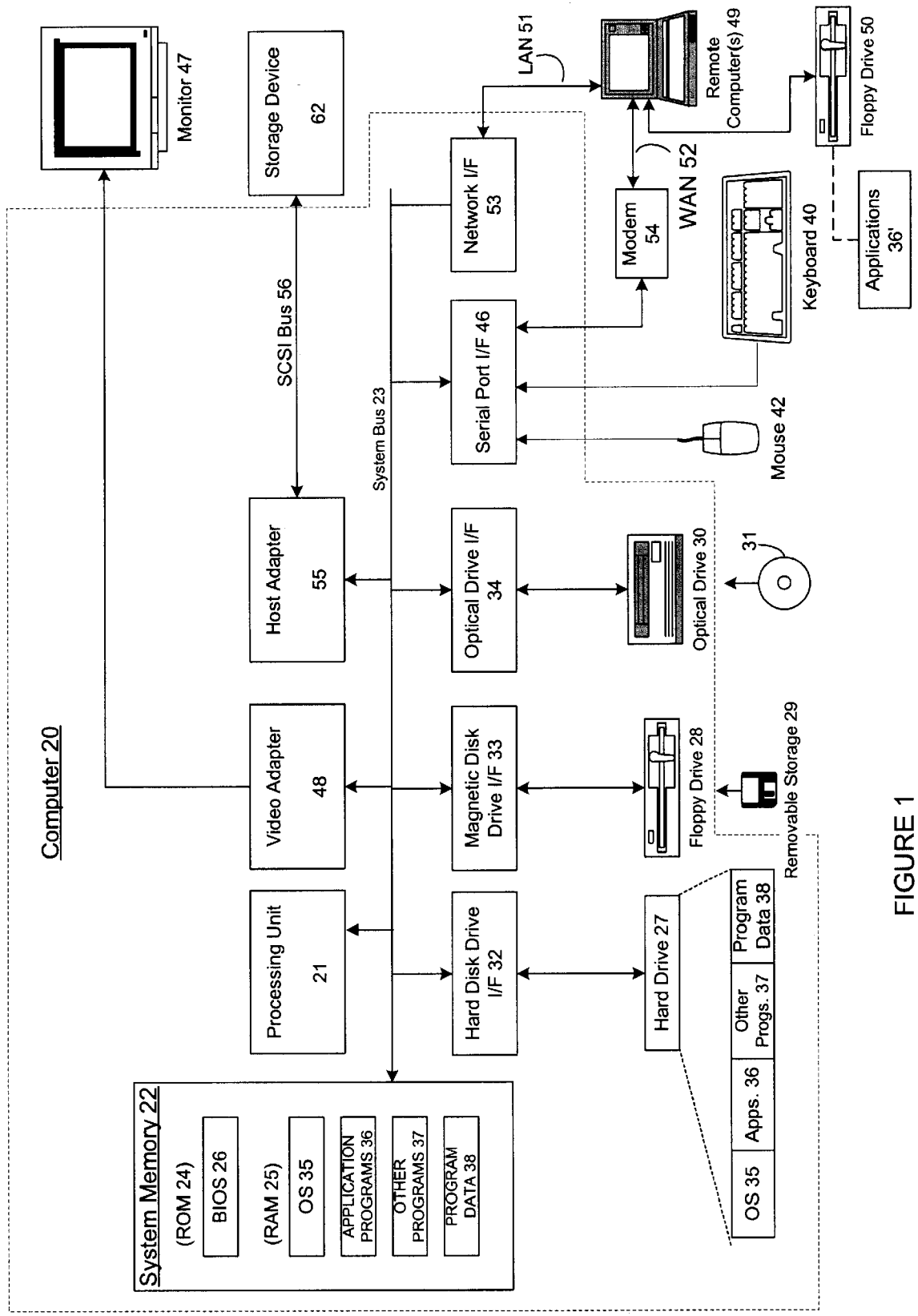
FIG. 1 is a block diagram representing a general purpose computer system in which aspects of the present invention may be incorporated.

The present invention provides a mechanism for obtaining information pertaining to electronic documents that reside on one or more server computers. While the following discussion describes an embodiment of the invention that crawls the Internet within the context of the World Wide Web, the present invention is not limited to that use. This present invention may also be employed on any type of computer network or individual computer having data stores for files, e-mail messages, databases and the like. The information from all such stores can be processed together or separately in accordance with the invention.

The present invention will now be explained with reference to a presently preferred embodiment thereof. An overview of Web crawler methods is provided first. After this overview, a description of exemplary computer and network environments is provided. Finally, a detailed description of the inventive methods of incremental Web crawling, and detecting duplicate documents in Web crawls using deleted documents counts, is provided.

Overview of Web Crawler Methods

A server computer on the Internet is sometimes referred to as a "Web site," and the process of locating and retrieving digital data from Web sites is sometimes referred to as "Web crawling." Web crawling may entail initially performing a first full crawl wherein a transaction log is "seeded" with one or more document address specifications. (The term address specification, address specifier, and URL are used interchangeably in this specification. These terms refer to any type of naming convention that may be used to address a file, and are not intended to imply that the present invention is limited to Internet applications.) Each document listed in the transaction log is retrieved from its Web site and processed. The processing may include extracting the data from each of these retrieved documents and storing that data in an index, or other database, with an associated "crawl number modified" that is set equal to a unique current crawl number that is associated with the first full crawl. A hash value (such as MD5) for the document and the document's time stamp may also be stored with the document data in the index. The document URL, its hash value, its time stamp, and its crawl number modified may then be stored in a persistent History Table used by the crawler to record documents that have been crawled.

Incremental crawls or additional full crawls may be performed after the first full crawl. During a full crawl, the transaction log is seeded with one or more document address specifications, which are used to retrieve the document associated with the address specification. The retrieved documents are recursively processed to find any linked document address specifications contained in the retrieved document. The document address specification of the linked document is added to the transaction log the first time it is found during the current crawl. The full crawl builds a new index based on the documents that it retrieves based on the seeds in its transaction log and the gathering rules that constrain the search. During the course of the full crawl, the document address specifications of the retrieved documents (for example, the documents' URLs) are compared to associated entries in the History Table (if there are any entries). URLs that are marked as having been crawled during this crawl are ignored.

An incremental crawl retrieves only documents that may have changed since the previous crawl. The incremental crawl uses the History Table and its transaction log is seeded with the document address specifications (URLs) contained in the History Table. In an incremental crawl, a document may be retrieved from a Web site if its time stamp is later than the time stamp stored in the History Table. This type of Web crawl is described in the above-cited U.S. patent application Ser. No. 09/105,758 ("Method of Web Crawling Utilizing Crawl Numbers").

To determine whether a substantive change has been made to the document, a Web crawler may filter extraneous data from the document (e.g., formatting information) and then compute a hash value for the remaining document data. The hash value would then be compared to a hash value stored in the History Table. Different hash values would indicate that the document has changed. If the hash value has changed, the document may be marked as modified and its crawl number modified may be set to the current crawl number (if applicable for the crawler.

Searches of the index, or database, created by the Web crawler can use the crawl number modified as a search parameter if a user is only interested in documents that have changed, or that have been added, since a previous search. In response to a request for only modified documents, the intermediate agent would implicitly add a limitation to the search that the search return only documents that have a crawl number modified that is subsequent to (greater than) a stored crawl number associated with a prior search.

Computer Environment

Web crawler programs execute on a computer. FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
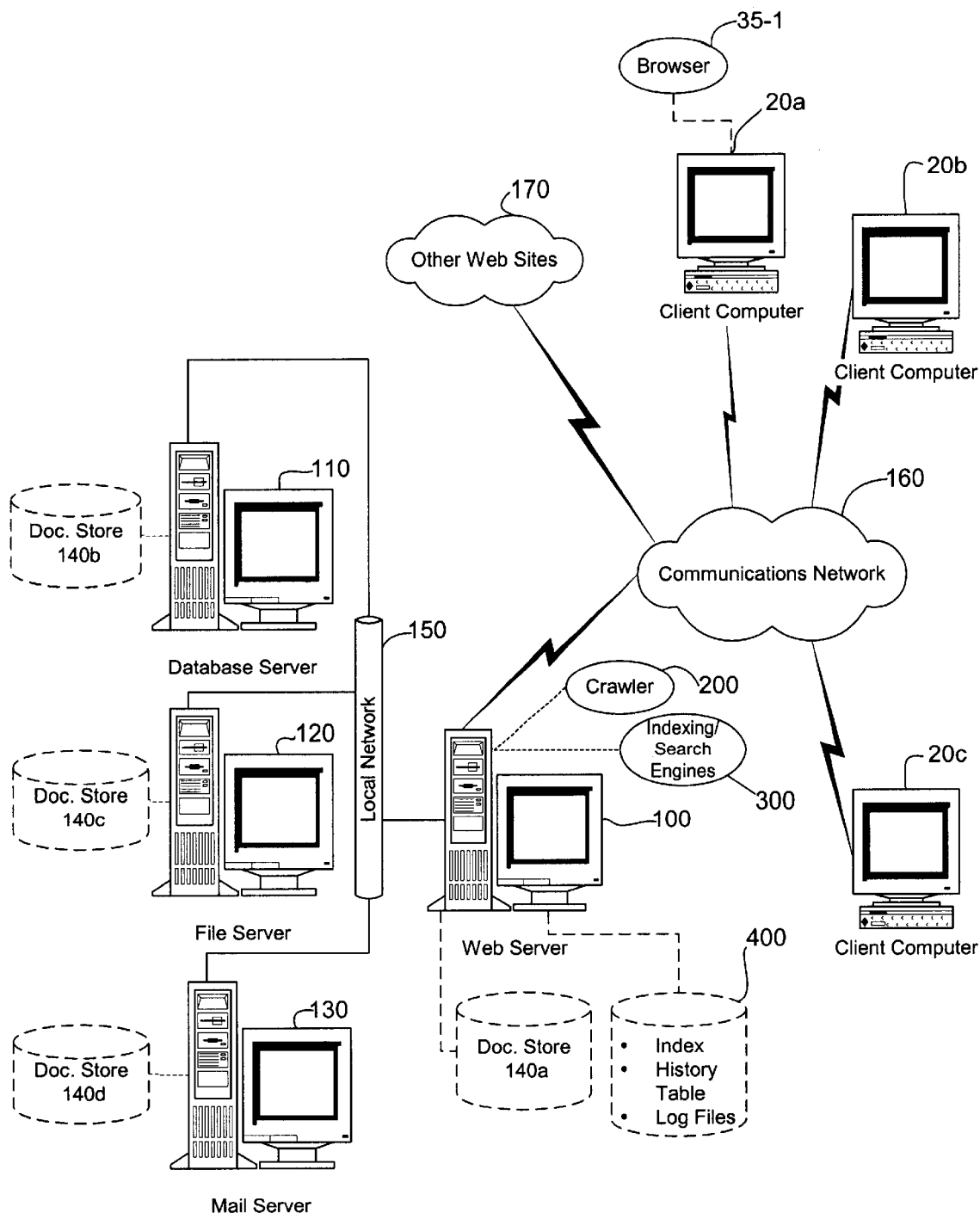
FIG. 2 is a schematic diagram representing a computer network in which aspects of the present invention may be incorporated.

As noted, the computer described above can be deployed as part of a computer network. In general, the above description applies to both server computers and client computers deployed in a network environment. FIG. 2 illustrates one such exemplary network environment in which the present invention may be employed.

As shown, a Web server 100 is interconnected with a number of other server computers, such as a database server 110, a file server 120, and a mail server 130. The Web server 100 includes a document store 140a. Similarly, the database server, file server, and mail server include document stores 140b, 140c and 140d, respectively. In this example, the Web server, database server, file server, and mail server are part of a local area network 150. A wide area communications network 160 (e.g., the Internet) permits remote Web sites 170 and client computers 20a, 20b, 20c, etc. (each equipped with a browser 35-1), to gain access to Web server 100, e.g., to search for documents or other forms of electronically stored information.

The Web server 100 contains a Web crawler program 200, which is employed as described above to gather information for use in a searchable index. In addition, as shown, the Web server contains a search engine 300 and a persistent store 400 for the index, History Table and log files. The Web crawler program 200 searches for electronic documents distributed on one or more computers connected to the Web server 100, including servers 110, 120 and 130, as well as remotely connected Web site(s) 170. Although the network 150 is shown as a local area network, it may be a WAN or a combination of networks that allow the Web server 100 to communicate with other computers having associated document stores available for indexing.

The Web crawler program 200 searches its own document store 140a and those of remote servers for electronic documents. It retrieves documents and associated data. The contents of the electronic documents, along with associated data, can be used in a variety of ways. For example, the Web crawler 200 may pass the information to indexing/search engines 300. The indexing engine 300-1 (see FIG. 3) is a computer program that maintains an index 400-1 of electronic documents. The index is like the index in a book and contains reference information and pointers to electronic documents to which the reference information applies. For example, the index may include keywords and for each keyword a list of addresses. Each address can be used to locate a document that includes the keyword. The index may also include information other than keywords used within the electronic documents. For example, the index may include subject headings or category names, even when the literal subject heading or category name is not included within the electronic document. The type of information stored in the index depends upon the complexity of the indexing engine 300-1, which may analyze the contents of the electronic document and store the results of the analysis.

A client computer, such as computer 20a, includes an OS browser function 35-1 (or separate browser application) that locates and displays documents to a user. When a user at the client computer desires to search for one or more electronic documents, the client computer transmits data to the search engine requesting a search. At that time, the search engine examines its associated index to find documents that may be desired by the user. The search engine may then return a list of documents to the browser 35-1. The user may then examine the list of documents and retrieve one or more desired electronic documents from remote computers.

As will be readily understood, the system illustrated in FIG. 2 is exemplary, and alternative configurations may also be used in accordance with the invention. For example, the Web crawler program 200 and indexing engine and search engines 300 may reside on different computers. Additionally, the Web browser 35-1 and the Web crawler program 200 may reside on a single computer. Further, the indexing and search engines 300 are not required by the present invention. The Web crawler program 200 may retrieve electronic document information for uses other than providing the information to a search engine. As discussed above, the client computer(s) 20a–20c, server computers 100–130, and remote Web site(s) 170 may communicate through any type of communications network or medium.

Detecting Duplicate Documents Using Content Identifiers

As mentioned above, one of the important and difficult problems that a crawler has to deal with is the duplication of documents. In the exemplary implementation of the invention, duplicates, also called replicas, are documents that have different URLs but the same physical storage location and thus the same content. It is important that the crawler detect such duplicate documents (assuming that creating an index is the primary application of the crawl). First, duplicate detection can be used to improve the performance of the indexing, since the duplicate documents do not have to be indexed twice. Second, duplicate detection can be used to improve the quality of search hits, since duplicate documents can be presented as one.

There are two types of duplicate documents: exact duplicates in the same document store, and exact or inexact duplicates in different document stores. An example of the first type is a file on one Web server accessed through different virtual roots. A virtual root is a URL prefix associated with a file system directory on the Web server's computer. (For example, http://msw/hrstuff/hrweb/blahblah/policy.html and http://msw/hrweb/policy.html could point to the same physical file.) Another example is a mail message sent to all corporate employees. An example of the second type of duplicate document is a file copied to two different machines.

A document store's ability to provide a property that uniquely identifies the document regardless of its URL may be employed in accordance with the present invention. Typical crawlers have no knowledge of the document store specifics. They cannot detect that two documents are duplicates other than by comparing some hash function calculated for both documents (e.g., calculating a Message Digest 5 (MD5) function for the new document and comparing it with a previously calculated MD5 for the previously crawled document). A problem with using a hash function to detect duplicates is that it requires accessing the document and filtering it, which constitutes approximately half the time it takes to crawl a document (crawl minus indexing). This is particularly critical for crawling a mail system where a message is often sent to many mailboxes or cross-posted to different public folders or news groups. An example of a mail server that employs a form of content identifier (in this case a globally unique "single-instance identifier," or SID) is disclosed in U.S. Pat. No. 5,813,008, Sep. 22, 1998, "Single Instance Storage of Information." However, this patent does not disclose the use of a content identifier by an external application, such as a Web crawler, for the purpose of detecting duplicate documents.

The performance of a crawl with respect to eliminating the work required to access duplicate documents could be greatly improved if the crawler could detect a duplicate before filtering the document. A solution to the problem can be provided if the document store supports a content identifier (CID) property or attribute for each document. In accordance with the present invention, the CID property can be fetched independently of the document itself and uniquely identifies the physical document. In other words, no two different documents would have equal CID properties, and the same document accessed through different URLs would return the same CID property.

The CID corresponds to the document's physical storage. Multiple documents, i.e., documents with different URLs, could share the same physical storage space. This would be the case, for example, with mail sent to 1000 people, where the same file is accessed through different virtual roots of a Web server, file links in file system, etc. The stores will assign a CID based on where the document is physically stored. This aspect of the present invention provides a performance advantage for the crawls but does not guarantee that documents having identical content but stored in different physical locations will be detected as duplicates.

According to the invention, the crawler (gatherer) fetches the CID property of the document first, looks in the History Table (or another table of CIDs), and, if it finds an existing CID of the same value, just notifies the indexing engine of the duplicate without filtering the document. In the case where the documents are gathered through notifications (the gatherer gets a notification with the URL of the document whenever the document gets modified, created or deleted), the CID property is passed by the notification source. This eliminates the need to connect to the server and fetch the CID property.

If the document store does not support the CID property, the gatherer may use MD5-based duplicate detection, i.e., it may fall back to prior methods of duplicate detection.

Figure 3:
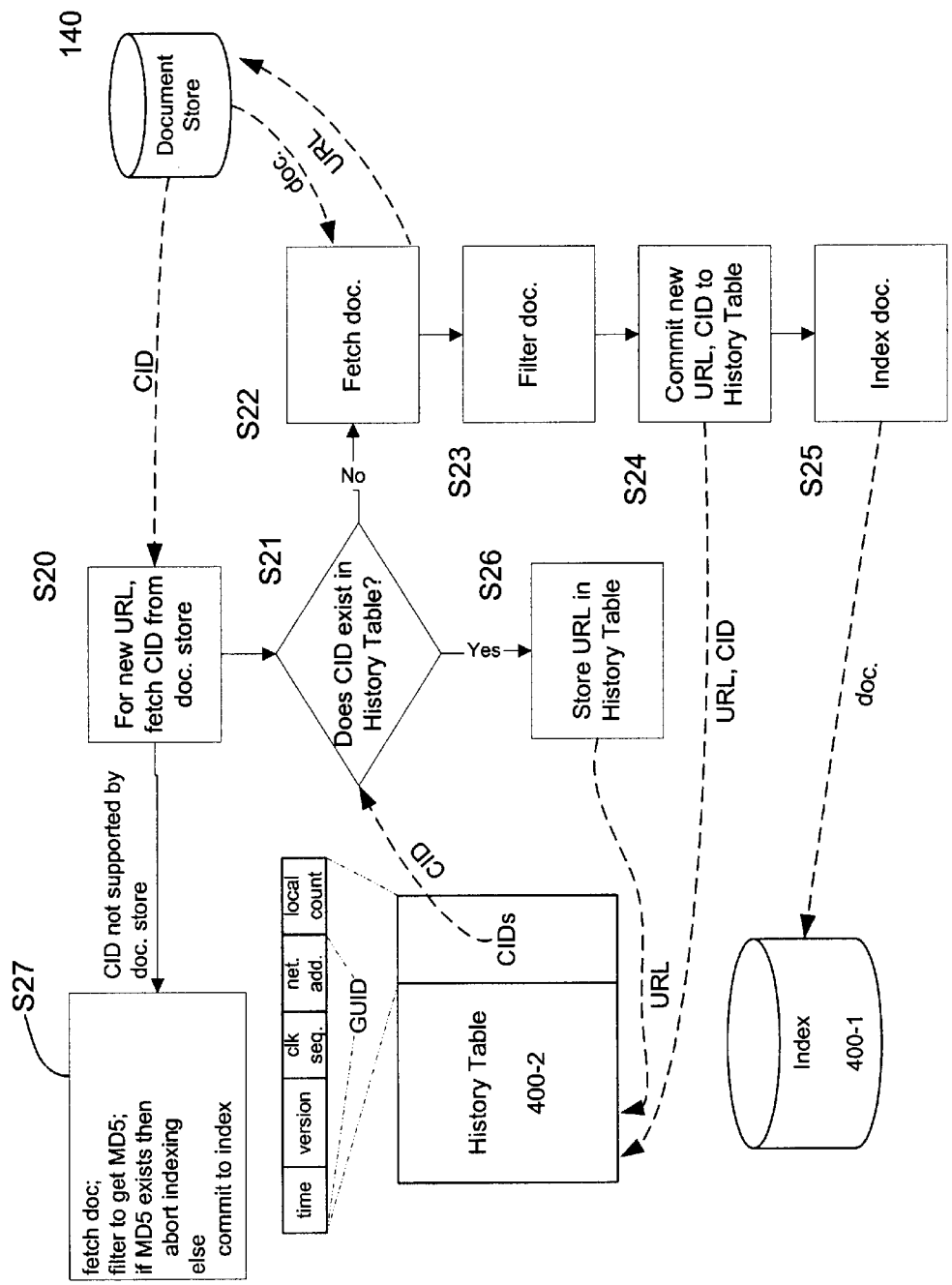
FIG. 3 is a flowchart of a method for detecting duplicate documents using a content identifier attribute in accordance with the present invention.

Referring now to FIG. 3, the duplicate detection procedure begins at step S20, wherein, for a URL in the History Table 400-2, the crawler fetches the CID for that document from the document store 140. In step S21, the crawler determines whether a CID having the same value as the one just obtained from the document store exists in the History Table. If not, steps S22 through S25 are performed; if so, step S26 is performed.

In step S22, the document corresponding to the new URL is fetched from the document store 140. In step S23, the document is filtered. (Filtering means parsing the document format to retrieve any useful information (text and properties) for crawling applications, such as indexing. This process also makes all documents in all different formats look the same to the crawler application.) In step S24, the URL and CID are committed to the History Table 400-2, and then in step S25 the document is committed to the index 400-1.

As indicated in the block for step S27, if the CID attribute is not supported by the document store 140, the crawler processes the document in accordance with a prior technique, i.e., by fetching the document, filtering it to obtain a hash function (MD5), and committing the document to an index if the hash function is not present in the History Table (or a separate table associated with the History Table).

Thus, a Web crawler application in accordance with the present invention takes advantage of a document store's ability to provide a unique content identifier (CID) that is indicative of the content/physical storage location of a data object or document, such as a Web page. The CID data structure may be an extension of the globally unique identifier (GUID) described in the above-referenced U.S. Pat. No. 5,813,008. For example, whereas the GUID is a 16-byte number, the CID of the present invention will preferably comprise a 16-byte GUID plus an additional 6-byte number.

The data structure of an exemplary CID is shown in FIG. 3. Preferably, the CID (like the SID described by U.S. Pat. No. 5,813,008) includes a globally unique identifier ("GUID") that uniquely identifies the server that is creating the CID. The GUID is 16 bytes and includes four subparts: (1) a 60-bit system time; (2) a 4-bit version number; (3) a 16-bit clock sequence 48; and (4) a 48-bit network address. An implementation of a process which generates GUID values as explained above can be obtained from Microsoft Corporation. The implementation resides in the Windows 32-bit software development kit (WIN32SDK) as a program called UUIDGEN. Since the 16-byte GUID value is much larger than the actual number of servers in any given client/server computing system, the 16-byte GUID value can be compressed and stored locally in an abbreviated form. A CID also includes a local counter value, e.g., a six-byte count. The length of the counter value may be adjusted but should be sufficiently long to avoid a short term rollover problem. Rollover should be avoided in order to ensure unique CID values. In addition, it is desirable to avoid CID values that are the same as the MD5 values used by document stores that do not support the CIDs of the present invention.

In sum, the present invention provides an improved Web/document crawling method and system. An important feature of the preferred embodiments of the invention is the use of a CID property that can be easily provided by a document store to enhance the efficiency and usefulness of a crawler or like application. It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of database and database management applications, including electronic messaging systems or mail severs. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic diskette) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A computer-based method for use in crawling a computer-readable document store, and particularly for detecting duplicate documents during a crawl so as to avoid unnecessarily retrieving and processing such duplicates, comprising the following acts:
   (a) obtaining from the document store a content identifier (CID) corresponding to a particular document, wherein the CID is characterized in that: (1) the CID can be fetched independently of the document itself, (2) the CID uniquely identifies the physical document in that no two different documents would have equal CIDs, and (3) the same document accessible through different URLs would have the same CID;
   (b) determining whether the value of the CID is the same as the value of a previously obtained CID corresponding to another document; and
   (c) if the value of the CID is not the same as the value of a previously obtained CID, fetching the particular document from the document store.

2. A method as recited in claim 1, wherein the CID is a number that has a prescribed format and is globally unique.

3. A method as recited in claim 2, wherein the CIDs of any two different documents will have different values.

4. A method as recited in claim 3, wherein the CID is generated as a value which is a function of the physical storage location of the document.

5. A method as recited in claim 4, wherein the CID of a document that is copied from a first storage location to a second storage location remains unchanged if the document in unmodified.

6. A method as recited in claim 1, wherein the CID is obtained from the document store by querying the document store with the address specifier of the particular document.

7. A method as recited in claim 1, further comprising indexing the particular document after it has been fetched from the document store.

8. A method as recited in claim 1, further comprising, if the value of the CID is the same as the value of a previously obtained CID, storing the address specifier of the particular document in a history table, without fetching the particular document from the document store.

9. A method as recited in claim 1, wherein the method is executed by a server computer coupled by a network to the document store.

10. A method as recited in claim 1, wherein the method is employed in connection with a Web crawler application.

11. A method as recited in claim 1, wherein the method is employed in connection with a mail server application.

12. A method as recited in claim 1, wherein the method is employed in connection with a directory service.

13. A method as recited in claim 1, wherein the method is employed in connection with a system requiring indexing or one-way replication of data, to optimize replication by not copying duplicate data.

14. A Web crawling method, comprising:
   providing a history table containing URLs of documents that have been indexed during a previous crawl, and content identifiers (CIDs) for such documents;
   for a first URL encountered during an incremental crawl, fetching from a document store a CID for the document corresponding to the first URL;
   determining whether a CID having the same value as the one just obtained from the document store exists in the history table;
   if a CID having the same value is not present in the history table, performing the following acts: (1) fetching the document corresponding to the first URL from the document store; (2) committing the first URL and CID to the history table; and (3) committing the document corresponding to the first URL to an index; and
   if a CID having the same value is present in the history table, committing the first URL to the history table.

15. A method as recited in claim 14, wherein the CID comprises a data structure that is an extension of a globally unique identifier (GUID).

16. A method as recited in claim 15, wherein the CID data structure includes (1) a 60-bit system time; (2) a 4-bit version number; (3) a 16-bit clock sequence 48; and (4) a 48-bit network address; and (5) a local counter value.

17. A method as recited in claim 16, wherein the local counter value is a six-byte number.

18. A computer-readable storage medium containing computer executable code for instructing a computer to carry out the steps recited in claim 14.

19. A computer system comprising:
   a server computer;
   a document store operatively coupled to the server computer, wherein the document store contains a plurality of electronic documents, and wherein the document store provides content identifiers (CIDs) for documents in the document store, wherein the CID is characterized in that: (1) the CID can be fetched independently of the document itself, (2) the CID uniquely identifies the physical document in that no two different documents would have equal CIDs, and (3) the same document accessible through different URLs would have the same CID;
   a computer readable storage medium operatively coupled to the server computer; and
   a computer-executable crawler application stored on the computer readable storage medium, wherein the crawler application is provided with the CIDs of selected documents on request.

20. A system as recited in claim 19, wherein the crawler application, when executed by the server, causes the following acts to be carried out by the server:
   obtaining from the document store the CID corresponding to a particular document;
   determining whether the value of the CID is the same as the value of a previously obtained CID corresponding to another document; and
   if the value of the CID is not the same as the value of a previously obtained CID, fetching the particular document from the document store.

21. A system as recited in claim 20, wherein the server computer comprises a member of a group consisting of a Web server, a mail server, a file server and a database server.

22. A system as recited in claim 19, wherein each CID has a value which is a function of the physical storage location of the document to which it relates.

* * * * *

UNITED STATES PATENT AND TRADEMARK OFFICE
CERTIFICATE OF CORRECTION

PATENT NO. : 6,547,829 B1
DATED : April 15, 2003
INVENTOR(S) : Dmitriy Meyerzon et al.

It is certified that error appears in the above-identified patent and that said Letters Patent is hereby corrected as shown below:

Column 5,
Line 13, insert -- ) -- after "crawler";

Column 11,
Line 31, delete "in" and insert -- is -- therefor.

Signed and Sealed this

First Day of July, 2003

JAMES E. ROGAN
*Director of the United States Patent and Trademark Office*